United States Patent
Huang et al.

(10) Patent No.: US 10,281,720 B2
(45) Date of Patent: May 7, 2019

(54) HEAD MOUNTED DISPLAY DEVICE AND CONTROL METHOD THEREOF

(71) Applicant: Acer Incorporated, New Taipei (TW)

(72) Inventors: Yu-Chun Huang, New Taipei (TW); Chih-Cheng Chen, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 15/828,641

(22) Filed: Dec. 1, 2017

(65) Prior Publication Data

US 2018/0314062 A1 Nov. 1, 2018

(30) Foreign Application Priority Data

Apr. 27, 2017 (TW) .............................. 106114070 A

(51) Int. Cl.
*G02B 27/00* (2006.01)
*G02B 27/01* (2006.01)

(52) U.S. Cl.
CPC ..... *G02B 27/0093* (2013.01); *G02B 27/0172* (2013.01); *G02B 27/0176* (2013.01); *G02B 2027/014* (2013.01); *G02B 2027/0138* (2013.01)

(58) Field of Classification Search
None
See application file for complete search history.

(56) References Cited

U.S. PATENT DOCUMENTS

| 8,350,805 B2* | 1/2013 | Miyazaki | G06F 3/01 345/156 |
| 2016/0187974 A1* | 6/2016 | Mallinson | G06F 3/014 463/32 |
| 2018/0330521 A1* | 11/2018 | Samples | G06T 7/85 |

FOREIGN PATENT DOCUMENTS

TW I555561 B 11/2016

OTHER PUBLICATIONS

Chinese language office action dated Jan. 5, 2018, issued in application No. TW 106114070.

* cited by examiner

*Primary Examiner* — Christopher J Kohlman
(74) *Attorney, Agent, or Firm* — McClure, Qualey & Rodack, LLP

(57) ABSTRACT

A head-mounted display (HMD) device includes a device body and a plurality of light-emitting diodes (LEDs). The plurality of LEDs are disposed on the device body. Any two adjacent LEDs have different flicker frequencies.

8 Claims, 5 Drawing Sheets

HEAD MOUNTED DISPLAY DEVICE AND CONTROL METHOD THEREOF

CROSS REFERENCE TO RELATED APPLICATIONS

This Application claims priority of Taiwan Patent Application No. 106114070 filed on Apr. 27, 2017, the entirety of which is incorporated by reference herein.

BACKGROUND OF THE INVENTION

Field of the Invention

The disclosure generally relates to a head-mounted display (HMD) device, and more particularly, to a head-mounted display device with high-accuracy positioning.

Description of the Related Art

Virtual reality (VR) uses a computer simulation to generate a three-dimensional (3D) virtual world, and it can provide a visual sensory simulation for a user, such that the user perceives an immersive environment. When the user moves, the computer can immediately perform a complex calculation and return an accurate image of the 3D world, and therefore the user senses the presence of the 3D world.

However, because the current technique for positioning and rotating detections is not accurate, the virtual reality experience can often make the user dizzy. Accordingly, there is a need to propose a novel design for overcoming this problem of the prior art.

BRIEF SUMMARY OF THE INVENTION

In a preferred embodiment, the disclosure is directed to a head-mounted display (HMD) device including a device body and a plurality of light-emitting diodes (LEDs). The plurality of LEDs are disposed on the device body. Any two adjacent of the plurality of LEDs have different flicker frequencies.

In some embodiments, a distance between any adjacent two of the plurality of LEDs is shorter than a first predetermined distance.

In some embodiments, the device body includes a top cover, a front cover, a left-side cover, and a right-side cover which are positioned on different planes.

In some embodiments, the plurality of LEDs are distributed over the top cover, the front cover, the left-side cover, and the right-side cover.

In some embodiments, at least one LED is disposed on each of the top cover, the front cover, the left-side cover, and the right-side cover.

In some embodiments, the plurality of LEDs are monitored by a motion capture system.

In some embodiments, when a distance between a specific one of the plurality of LEDs and the motion capture system is longer than a second predetermined distance, brightness of the specific one of the plurality of LEDs is enhanced.

In some embodiments, the motion capture system is a camera module.

In another preferred embodiment, the invention is directed to a control method for a head-mounted display (HMD) device. The control method includes the steps of: disposing a plurality of light-emitting diodes (LEDs) on a device body; and controlling any adjacent two of the plurality of LEDs to have different flicker frequencies.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

Figure 1:
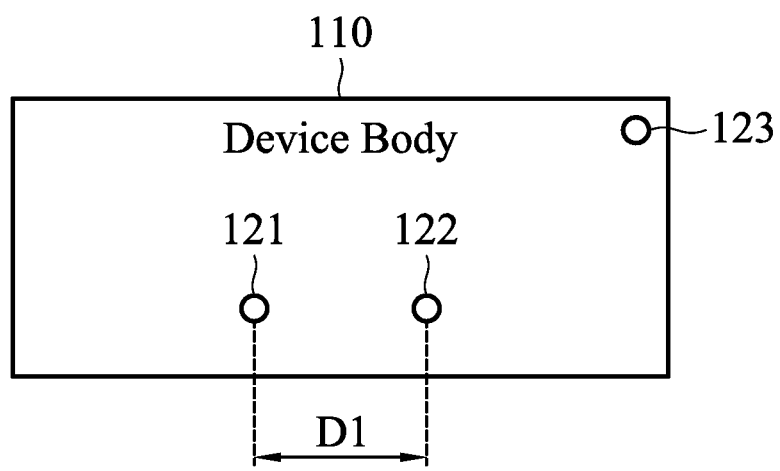
FIG. 1 is a diagram of a head-mounted display (HMD) device according to an embodiment of the invention.

FIG. 1 is a diagram of a head-mounted display (HMD) device 100 according to an embodiment of the invention. The head-mounted display device 100 can be applied to a virtual reality (VR) technique. A user can wear the head-mounted display device 100. As shown in FIG. 1, the head-mounted display device 100 includes a device body 110 and a plurality of light-emitting diodes (LEDs) 121, 122, and 123. The LEDs 121, 122, and 123 are disposed on the device body 110. Any adjacent two of the LEDs 121, 122, and 123 (e.g., the LEDs 121 and 122) have different flicker frequencies. For example, the flicker frequency of the LED 121 may be 100 Hz, and the flicker frequency of another LED 122, which is adjacent to the LED 121, may be 200 Hz. Conversely, the flicker frequency of the LED 123, which is away from the LEDs 121 and 122, is not restricted. For example, the flicker frequency of the LED 123 may be 100 Hz, 200 Hz, 400 Hz, or any other frequency. In some embodiments, a distance D1 between the so-called "any adjacent two of the LEDs" (e.g., the LEDs 121 and 122) should be shorter than a first predetermined distance (e.g., 2 cm or 3 cm). On the contrary, if the distance D1 is longer than the first predetermined distance, it will be determined that the corresponding two LEDs are not adjacent to each other. It should be noted that the head-mounted display device 100 may further include other components, such as a display device, a top cover, a front cover, a left-side cover, a right-side cover although they are not displayed in FIG. 1.

In alternative embodiments, the head-mounted display device 100 includes fewer or more LEDs, such as 2, 4, 5, 6, or any multiple of 4.

Generally, a motion capture system is arranged for positioning the device body 110 of the head-mounted display device 100 according to the light-emitting information from the LEDs 121, 122, and 123. For a conventional design, because all of the LEDs 121, 122, 123 have the same flicker frequency, the motion capture system tends to mix up adjacent LEDs (e.g., the motion capture system may construe the adjacent LEDs 121 and 122 as a single light source). This may reduce the accuracy of positioning and cause a user wearing the head-mounted display device 100 to feel dizzy. To solve the problem of the prior art, the invention proposes a novel design to make every adjacent two of the LEDs 121, 122, and 123 have different flicker frequencies. With such a design, the recognition rate of the motion capture system for detecting each of the LEDs 121, 122, and 123 is enhanced, and it helps to increase the whole fidelity of the VR system and prevent the user from being uncomfortable when wearing the head-mounted display device 100.

It should be understood that the shape and type of the head-mounted display device 100, and the number and arrangement of the LEDs 121, 122, and 123 thereon are not restricted in the invention. The following embodiments will introduce a variety of configurations of the head-mounted display device 100; however, their contents are used for the reader to easily understand the invention, rather than limitations of the invention.

Figure 2A:
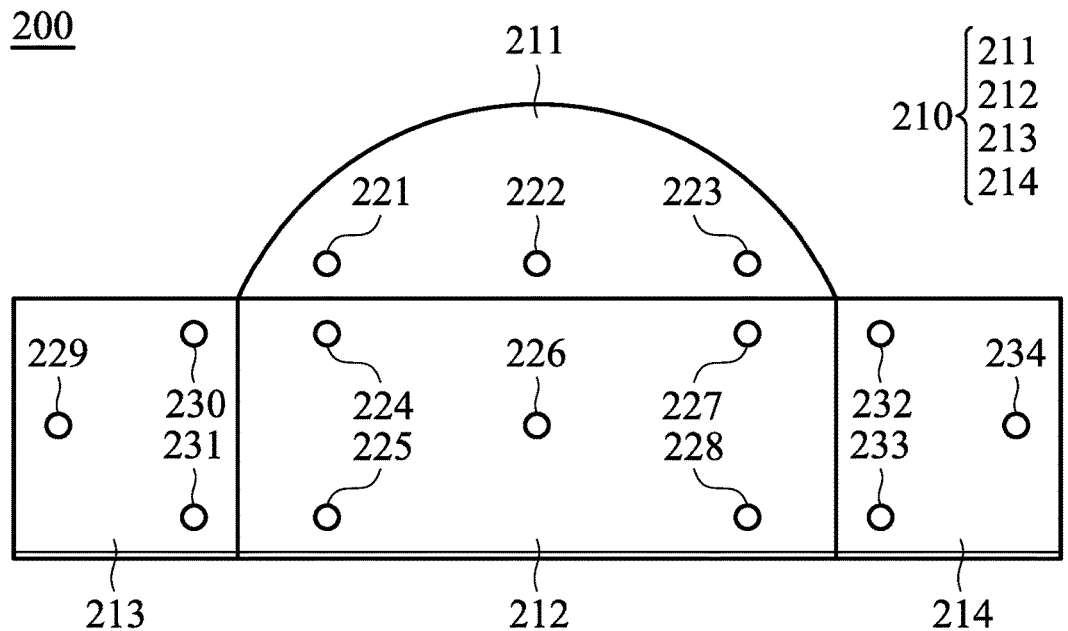
FIG. 2A is an exploded view of a head-mounted display device according to an embodiment of the invention.
Figure 2B:
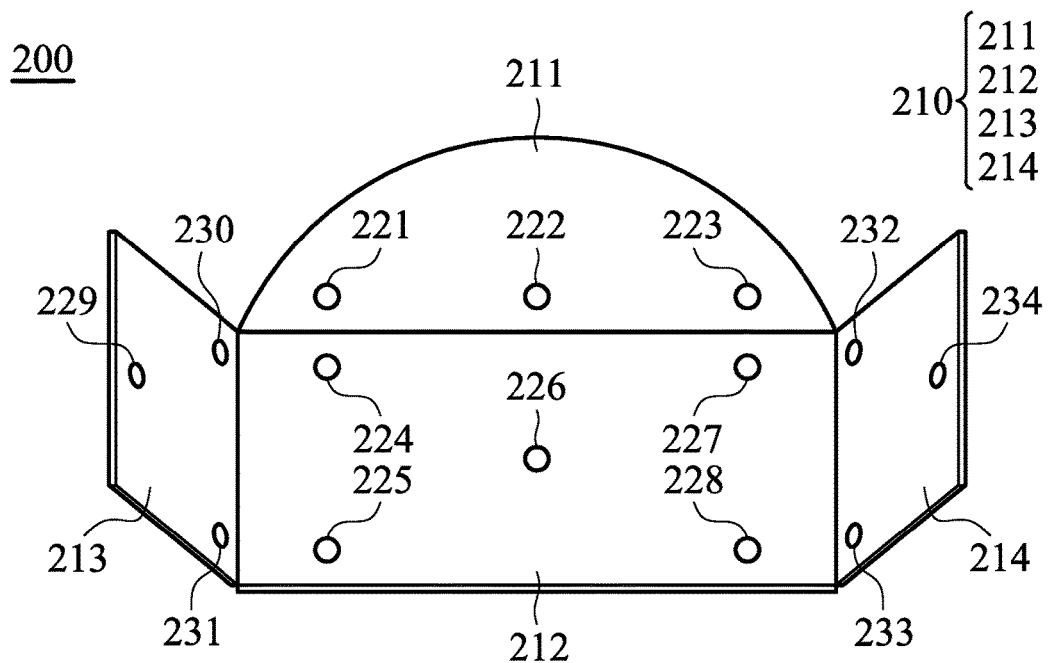
FIG. 2B is a perspective view of a head-mounted display device according to an embodiment of the invention.

FIG. 2A is an exploded view of a head-mounted display device 200 according to an embodiment of the invention. FIG. 2B is a perspective view of the head-mounted display device 200 according to an embodiment of the invention. Please refer to FIG. 2A and FIG. 2B together. In the embodiment of FIG. 2A and FIG. 2B, a device body 210 of the head-mounted display device 200 includes a top cover 211, a front cover 212, a left-side cover 213, and a right-side cover 214 which are positioned on different planes. There are a plurality of LEDs 221, 222, . . . , and 234 uniformly or non-uniformly distributed over the top cover 211, the front cover 212, the left-side cover 213, and the right-side cover 214. In some embodiments, at least one respective LED is disposed on each of the top cover 211, the front cover 212, the left-side cover 213, and the right-side cover 214. For example, three LEDs 221, 222, and 223 may be disposed on the top cover 211; five LEDs 224, 225, 226, 227, and 228 may be disposed on the front cover 212; three LEDs 229, 230, and 231 may be disposed on the left-side cover 213; and three LEDs 232, 233, and 234 may be disposed on the right-side cover 214.

As mentioned above, every adjacent two of the LEDs 221, 222, . . . , and 234 should have different flicker frequencies. In some embodiments, if the distance between any two of the LEDs 221, 222, . . . , and 234 (e.g., the LEDs 221 and 224) is shorter than a first predetermined distance (e.g., 2 cm or 3 cm), the two LEDs will be considered adjacent to each other (no matter whether or not the two LEDs are disposed on the same plane), and they will have different flicker frequencies. Conversely, non-adjacent LEDs (e.g., LEDs 221 and 233), whose spacing therebetween is longer than the first predetermined distance, are not limited by the above, and they may have the same flicker frequency or different flicker frequencies. In other embodiments, the head-mounted display device 200 includes fewer or more LEDs, and their distribution on the display device 200 is adjustable in response to different requirements.

Figure 3:
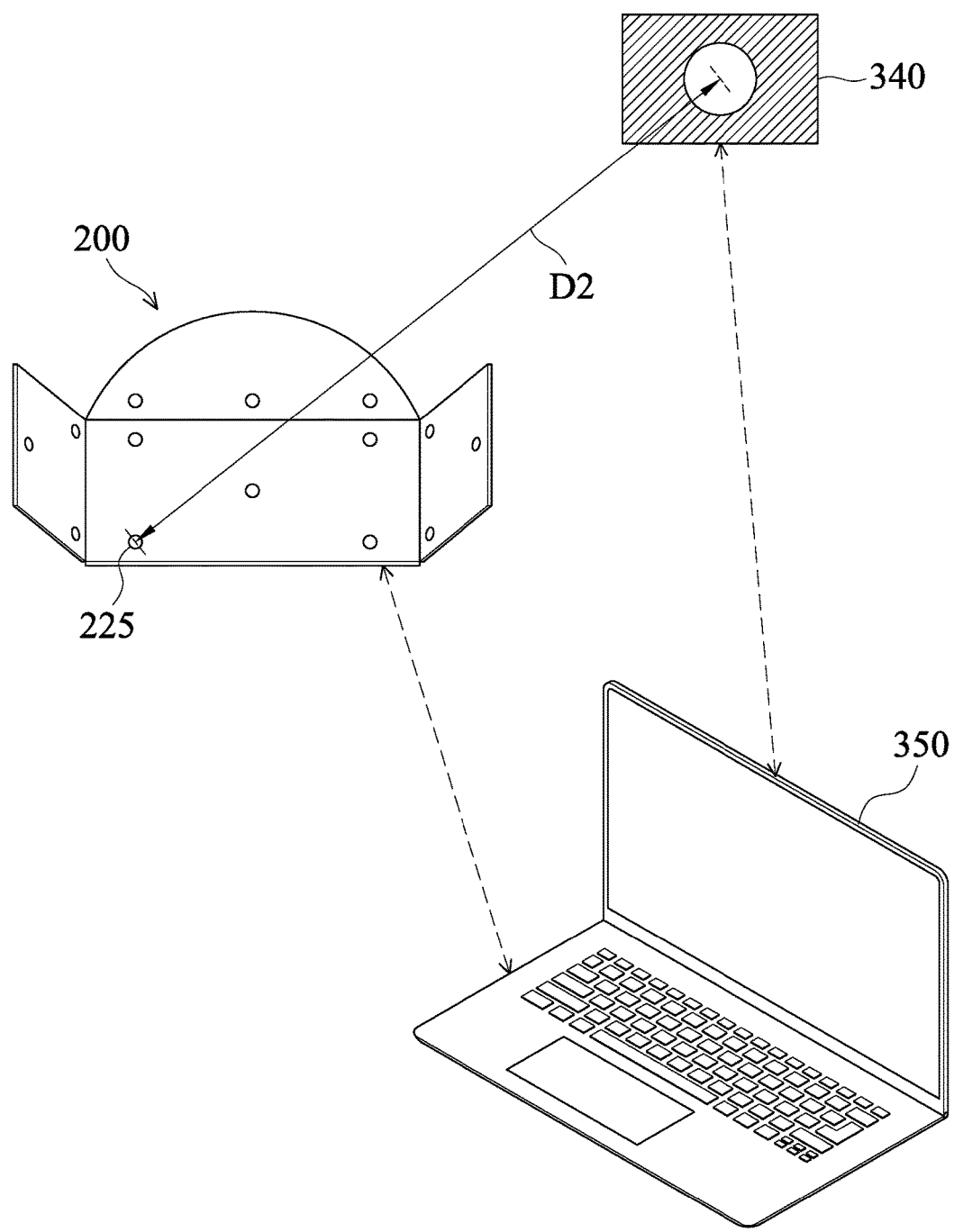
FIG. 3 is a diagram of operations of a head-mounted display device according to an embodiment of the invention.

FIG. 3 is a diagram of operations of the head-mounted display device 200 according to an embodiment of the invention. In the embodiment of FIG. 3, the LEDs 221, 222, . . . , and 234 of the head-mounted display device 200 are monitored by a motion capture system 340. For example, the motion capture system 340 may be a camera module, which may be configured to detect the coordinate position, the luminous brightness, and the flicker frequency of each of the LEDs 221, 222, . . . , and 234. In some embodiments, the motion capture system 340 estimates the distance between an LED and itself according to the brightness of the aforementioned LED. Both the head-mounted display device 200 and the motion capture system 340 may be coupled to a computing device 350 through a wired mechanism or a wireless mechanism. For example, the computing device 350 may be a smartphone, a tablet computer, or a notebook computer. When the distance D2 between a specific LED among LEDs 221, 222, . . . , and 234 (e.g., LED 225) and the motion capture system 340 is longer than a second predetermined distance (e.g., 1 m or 2 m), the motion capture system 340 can return a detection result to the computing device 350. Accordingly, the computing device 350 can control the head-mounted display device 200 to enhance the brightness of the aforementioned specific LED (e.g., the LED 225). With such a design, even if the distance between any LED and the motion capture system 340 is too long, and it is difficult to detect and position the LED, the motion capture system 340 can still accurately position the head-mounted display device 200 by increasing the brightness of the aforementioned LED using a negative feedback mechanism.

Figure 4:
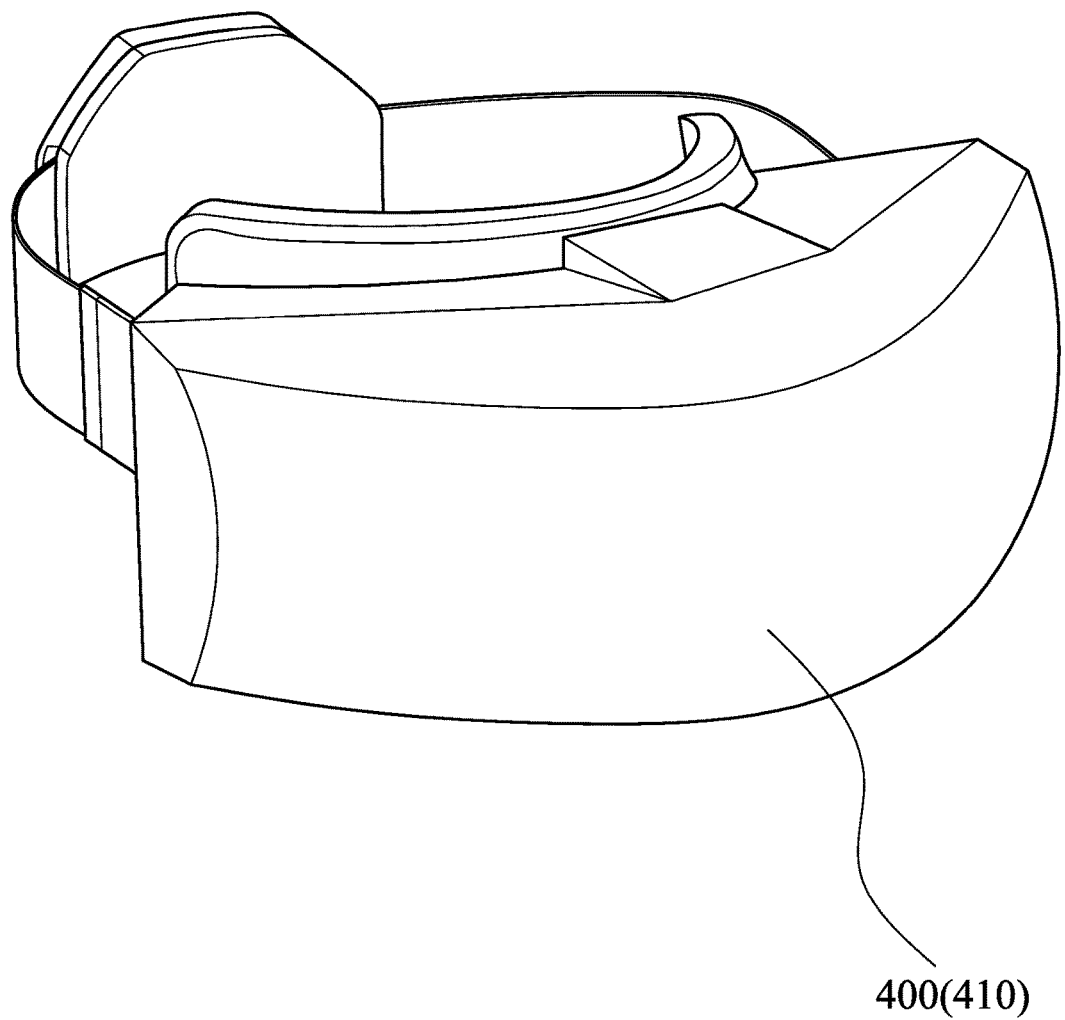
FIG. 4 is a perspective view of a device body of a head-mounted display device according to an embodiment of the invention.

FIG. 4 is a perspective view of a device body 410 of a head-mounted display device 400 according to an embodiment of the invention. FIG. 4 is exemplary for displaying the style of a practical product of the head-mounted display device 400, but it is not a limitation of the invention.

Figure 5:
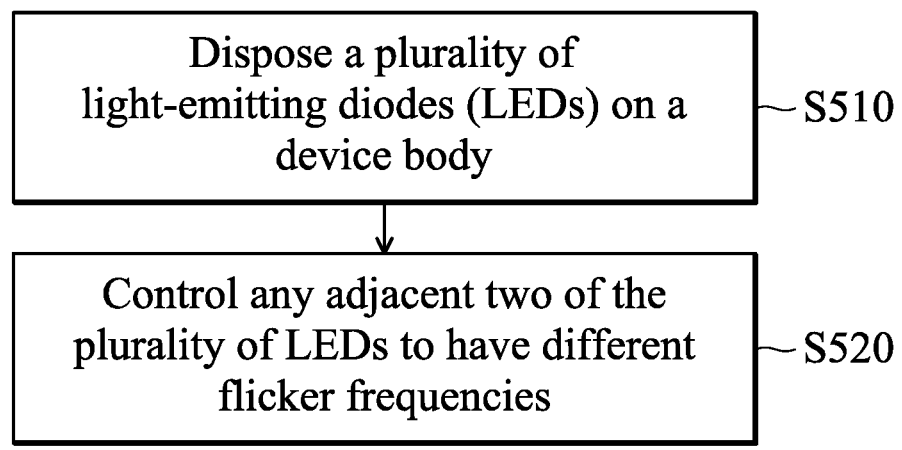
FIG. 5 is a flowchart of a control method for a head-mounted display device according to an embodiment of the invention.

FIG. 5 is a flowchart of a control method for a head-mounted display device according to an embodiment of the invention. To begin, in step S510, a plurality of light-emitting diodes (LEDs) are disposed on a device body. Next, in step S520, any adjacent two of the plurality of LEDs are controlled to have different flicker frequencies. For example, a distance between any adjacent two of the LEDs may be shorter than a first predetermined distance, and the first predetermined distance may be 2 cm or 3 cm. It should be noted that the steps of FIG. 5 are not required to be performed sequentially, and each feature of the embodiments of FIGS. 1 to 4 may be applied to the control method of FIG. 5.

Note that the above element parameters and flicker frequencies are not limitations of the invention. A designer can fine-tune these settings or values according to different requirements. It should be understood that the head-mounted display device and the control method of the invention are not limited to the configurations of FIGS. 1-5. The invention may merely include any one or more features of any one or more embodiments of FIGS. 1-5. In other words, not all of the features displayed in the figures should be implemented in the head-mounted display device and the control method of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A head-mounted display (HMD) device, comprising:
a device body; and
a plurality of light-emitting diodes (LEDs), disposed on the device body, wherein any adjacent two of the plurality of LEDs have different flicker frequencies;
wherein the plurality of LEDs are monitored by a motion capture system which is independent of the HMD, and distances between the plurality of LEDs and the motion capture system are detected by the motion capture system;
wherein when a distance between a specific one of the plurality of LEDs and the motion capture system is longer than a second predetermined distance, brightness of the specific one of the plurality of LEDs is enhanced.

2. The head-mounted display device as claimed in claim 1, wherein a distance between any adjacent two of the plurality of LEDs is shorter than a first predetermined distance.

3. The head-mounted display device as claimed in claim 1, wherein the device body comprises a top cover, a front cover, a left-side cover, and a right-side cover which are positioned on different planes.

4. The head-mounted display device as claimed in claim 3, wherein the plurality of LEDs are distributed over the top cover, the front cover, the left-side cover, and the right-side cover.

5. The head-mounted display device as claimed in claim 4, wherein at least one LED is disposed on each of the top cover, the front cover, the left-side cover, and the right-side cover.

6. The head-mounted display device as claimed in claim 1, wherein the motion capture system is a camera module.

7. A control method for a head-mounted display (HMD) device, comprising the steps of:
disposing a plurality of light-emitting diodes (LEDs) on a device body; and
controlling any adjacent two of the plurality of LEDs to have different flicker frequencies;
wherein the plurality of LEDs are monitored by a motion capture system which is independent of the HMD, and distances between the plurality of LEDs and the motion capture system are detected by the motion capture system;
wherein when a distance between a specific one of the plurality of LEDs and the motion capture system is longer than a second predetermined distance, brightness of the specific one of the plurality of LEDs is enhanced.

8. The control method as claimed in claim 7, wherein a distance between any adjacent two of the plurality of LEDs is shorter than a first predetermined distance.

* * * * *